US005658540A

United States Patent [19]
Valentino

[11] Patent Number: 5,658,540
[45] Date of Patent: *Aug. 19, 1997

[54] HIGH-TECH COMPUTERIZED CONTAINMENT AND TREATMENT APPARATUS AND PROCESS FOR COMBUSTION OFF-GAS

[76] Inventor: Joseph V. Valentino, 8 Saxon Wood Park Dr., White Plains, N.Y. 10605

[*] Notice: The portion of the term of this patent subsequent to Apr. 14, 2009, has been disclaimed.

[21] Appl. No.: 809,884

[22] Filed: Dec. 18, 1991

Related U.S. Application Data

[63] Continuation-in-part of Ser. No. 651,656, Feb. 6, 1991, Pat. No. 5,103,742.

[51] Int. Cl.⁶ .................... F23J 15/00; B01D 53/34
[52] U.S. Cl. .................... 423/210; 423/DIG. 5; 422/110; 422/168; 422/185; 110/215; 110/345
[58] Field of Search .................... 60/282; 110/215, 110/345, 185; 422/110, 111, 172, 168; 423/246, 415 A, 210, 415.1; 425/DIG. 5

[56] References Cited

U.S. PATENT DOCUMENTS

| T909,017 | 4/1973 | Jordan et al. | 423/242 |
|---|---|---|---|
| 2,351,167 | 6/1944 | Ware | 423/219 |
| 4,159,201 | 6/1979 | Staege | 75/91 |
| 4,208,383 | 6/1980 | Kisters et al. | 423/215.5 |
| 4,293,521 | 10/1981 | Isahaya et al. | 422/62 |
| 4,323,371 | 4/1982 | Ritvanen | 55/19 |
| 4,509,436 | 4/1985 | Schröfelbauer et al. | 110/345 |
| 4,670,221 | 6/1987 | Marnet et al. | 422/107 |
| 4,909,160 | 3/1990 | Frick et al. | 110/185 |
| 5,103,742 | 4/1992 | Valentino | 110/215 |

FOREIGN PATENT DOCUMENTS

| 3313171 | 10/1984 | Germany | 423/246 |
|---|---|---|---|

OTHER PUBLICATIONS

Hershkowitz "Burning Trash: How It Could Work" Technology Review, Jul. 197, pp. 27–34.

Primary Examiner—Gary P. Straub
Assistant Examiner—Timothy C. Vanoy
Attorney, Agent, or Firm—Harold James; Robert L. Epstein; James & Franklin

[57] ABSTRACT

An integrated, at least substantially self-contained and at least substantially closed-loop combustion process and system for the control of gaseous, ionic, colloidal, liquid or particulate matter, particularly noxious contaminants contained in the off-gas of a combustion unit, the system comprising a:

(a) chemical treatment chamber;
(b) a reactant source communicating with the treatment chamber and adapted to provide reactant chemicals in contact with the off-gas;
(c) a reactant chemical selector associated with the reactant source;
(d) a control device communicating with the off-gas within the combustion system for analyzing the off-gas and actuating the selector in response to the analysis to provide reactant chemicals for contact with the off-gas;
(e) an expansion chamber communicating with the treatment chamber and adapted to provide a reduced pressure region of treated off-gas received from the treatment chamber means;
(f) an exhaust port in the expansion chamber for discharging the off-gas, and
(g) cooling means for cooling the off-gas in one or more locations within the combustion system.

23 Claims, 7 Drawing Sheets

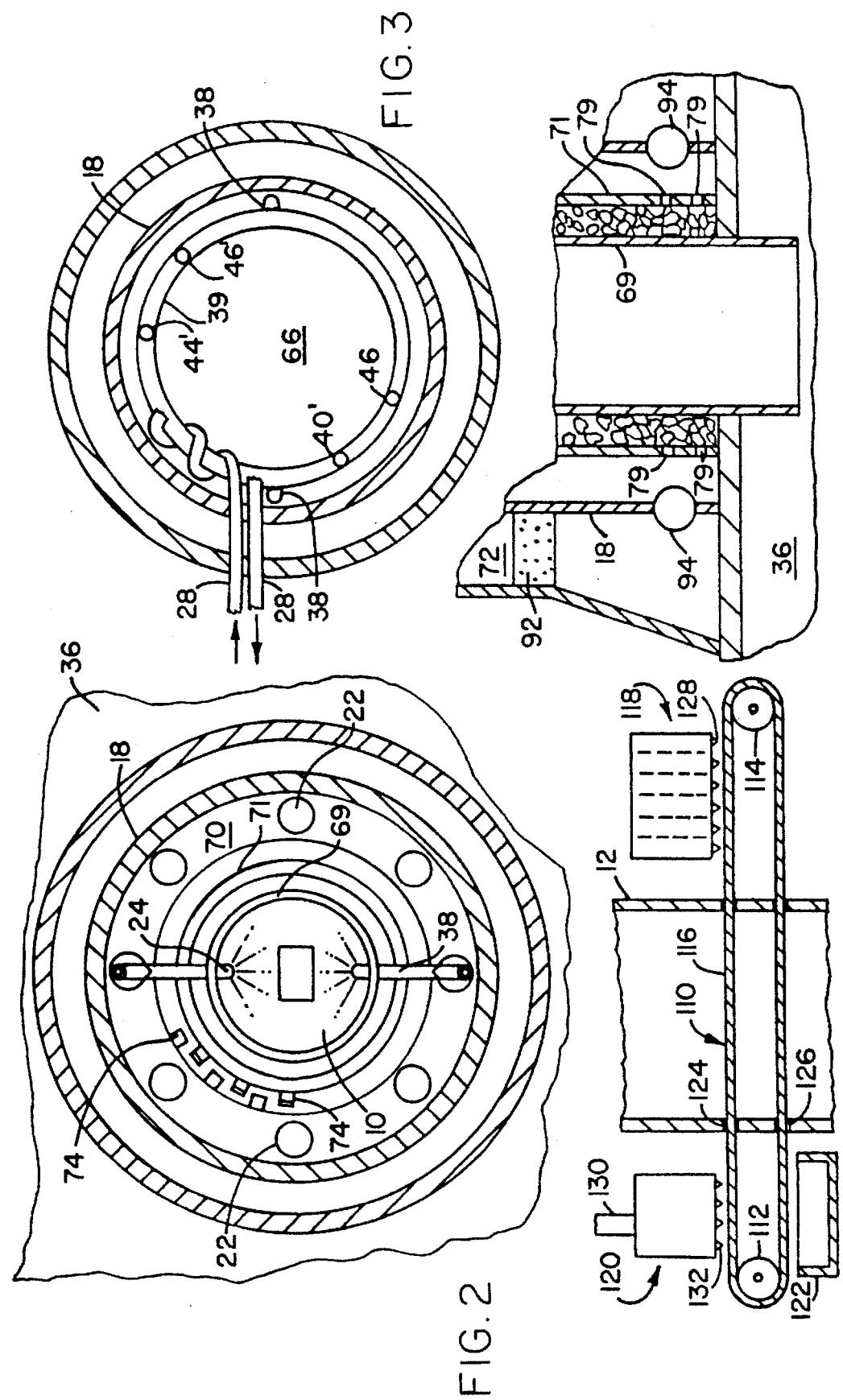

HIGH-TECH COMPUTERIZED CONTAINMENT AND TREATMENT APPARATUS AND PROCESS FOR COMBUSTION OFF-GAS

FIELD OF INVENTION

This application is a continuation-in-part of Ser. No. 07/651,656 filed Feb. 6, 1991 now U.S. Pat. No. 5,103,742, the invention concerning method and apparatus for the handling of combustion off-gas or flue gas, and particularly concerns such method and apparatus which are readily adapted to existing incineration, heating or power installations, and which can effect extensive diminution in noxious off-gas contaminants, or substantially total containment of such off-gas including any liquid, gaseous, ionic, colloidal or sizeable particulate off-gas constituents including contaminants such as fly ash and noxious gases, which constituents heretofore have been vented mainly to the atmosphere. Also, the method and apparatus are uniquely adapted for employing the kinetic energy of the off-gas and steam or otherwise developed back pressure to generate power through turbine equipment or the like.

BACKGROUND OF INVENTION AND PRIOR ART

The air pollution problems associated with such combustion by-products as, for example, the various oxides of nitrogen, sulfur, carbon, phosphorus, mercury and other metals, the various halides such as HCl and HBr, the phosphoryl compounds, the many other volatile metal halides, oxides and complexes, the various sulfur containing compounds such as hydrogen sulfide or carbon disulfide, and the organic toxic pollutants such as dioxin and the like which are in themselves highly volatile and elusive, or are strongly adsorbed on fly ash, are well recognized and of course, are the subject of intensive international research and development effort. Such by-products typically are produced through garbage or trash incineration, or building heating, power production or the like from fossil or other fuels.

Industry has responded to these problems with many pollution control devices and processes such as off-gas scrubbing, filtering, electrical precipitation, electric arc afterburning, catalytic burning, baffled flues and chimneys, and the like, many of which are of limited practical valve, particularly for the effective removal of many of the above by-products, fly ash and other particulate fines, and practically all of which devices require large and expensive special auxilliary off-gas handling equipment and housing structures therefor. Ofttimes these control devices are not adaptable to existing flue equipment and the cooperating or supporting equipment or installations comprises several buildings or at least several interconnected but separate installations of scrubbers, cyclone separators, filter equipment, economizers, and the like, which necessarily complicate the off-gas treatment aspect, from both the labor and apparatus standpoint, particularly maintenance, and leads to unmanageable cost of off-gas clean up. Typical such prior installations are depicted and discussed in the Allen Hershkowitz article in *Technology Review*, Jul. 30, 1987, and in U.S. Pat. Nos. 3,710,555; 3,706,182; 3,695,004; 3,984,220; 4,095,514; 4,286,973; 4,206,722; 4,635,569; and 3,442,232, the disclosures of all of which are incorporated herein by reference, particularly the relevant structures thereof, e.g., the spray or jet nozzles.

Objects of the present invention therefore, are:

(1) to provide a treatment process and apparatus for decontaminating the air (off-gas) of combustion systems, which process and apparatus are useable as original process and equipment of, or readily adaptable to, existing combustion units comprised of fire box and flue structures, at minimum reconstruction effort and cost, and which are highly effective in essentially eliminating combustion produced air contaminants of all types which are carried in the off-gas. As a result, substantial amounts of the contaminant diminished air can be recycled to the combustion unit or sent to other substantially contained equipment for use in various chemical or other industrial processes such that actual off-gas emissions to the atmosphere are essentially eliminated;

(2) to provide such process and apparatus which provide chemical treatment means for the off-gas, adaptable to automatic, electronic and computerized control;

(3) to provide such process and apparatus with continuous or semi-continuous off-gas monitoring analysis, computer interpretation of the analysis data, and computer regulation of chemical reactor means within the flue system for reacting out normally pollutant contaminant chemicals in response to said computer interpretation;

(4) to provide such method and apparatus in a substantially closed-loop form to thereby essentially eliminate atmospheric contamination; and (5) to provide such method and apparatus which are energy efficient and capable of effectively generating power, particularly electric power, and also capable of feeding various industrial gas processing installations such as dry ice manufacture, sulfuric acid manufacture, and oxo processes.

SUMMARY OF THE INVENTION

These and other objects hereinafter becoming evident have been attained in accordance with the present invention which, in its process embodiment is defined as the process for selectively controlling the concentration of one or more chemical contaminants, either gaseous, liquid or solid, in the off-gas of a combustion system having associated fire box means and flue system, comprising carrying out the following procedures, in any order, in a continuous or semi-continuous manner;

(a) analyzing the chemical composition of the off-gas at one or more locations in said flue system;

(b) directing the off-gas from the fire box means into chemical treatment chamber means dynamically maintained within a predesigned off-gas pressure range;

(c) contacting the off-gas in said treatment chamber means with reactant chemical means previously adjusted in reactivity and specificity according to the chemical analysis of the off-gas, for converting prescribed amounts of one or more of said contaminants in said off-gas to one or more desired decontamination products;

(d) exiting the treated off-gas from said treatment chamber means to expansion chamber means maintained within a dynamically predesigned off-gas pressure range lower than pressures maintained in said treatment chamber means to effect a reduction in the kinetic energy of the treated off-gas and thus facilitate removal of said products therefrom; and (e) removing a desired amount of said products from the off-gas.

In certain preferred process embodiments:

(1) the reduced kinetic energy off-gas is passed through filtering means for removing particulate matter therefrom prior to exiting to said gas processing means;

(2) said off-gas in said expansion chamber means is scrubbed with aqueous material to separate particulate matter therefrom;

(3) the temperature and kinetic energy of the off-gas in the flue system is further reduced by contact of the off-gas with heat exchanger cooling means;

(4) said reactant chemical means comprises aqueous material containing at least one reactant chemical and is injected as a spray into said off-gas;

(5) the off-gas from the expansion chamber means is directed to gas separation means for separating exiting carry-over gases comprising one or more of carbon monoxide, carbon dioxide, nitrogen containing gases, sulfur containing gases, oxygen, hydrogen and water vapor, and selectively feeding one or more industrial gas processing installations specific to each gas for the conversion therein to non-pollutant product;

(6) the separated carbon dioxide is fed to dry ice manufacturing means, and/or the separated carbon nonoxide is fed to hydroformylation reactor means;

(7) the off-gas from the expansion chamber means is directed to power generating turbine means;

(8) a portion of said off-gas from said expansion chamber means is recycled to the combustion system;

(9) plural pairs of treatment chamber means and expansion chamber means are employed in a series arrangement in concert with reactant chemical selection to reduce to a minimum the pollutant type contaminants present in the off-gas; and

(10) the products-diminished off-gas is directed to substantially contained gas processing means substantially isolated from the atmosphere.

The structural embodiment of the invention is defined in its general sense as a combustion system adapted for the selective control of the types and concentrations of gaseous, ionic, collodial, liquid or particulate matter, particularly noxious contaminants, contained in the off-gas of a combustion unit, wherein the subsequently contaminant-diminished off-gas is to be emitted to the atmosphere or contained substantially within the system, said system comprising:

(a) chemical treatment chamber means defined by
  (i) first wall means,
  (ii) off-gas inlet means in said first wall means, and
  (iii) outlet means in said first wall means providing an exit for chemically treated off-gas from said treatment chamber means;

(b) reactor means communicating with said treatment chamber means and adapted to provide reactant chemicals thereto for contact with the off-gas in said treatment chamber means for producing decontamination product;

(c) reactant chemical selecting means associated with said reactor means and adapted for providing selected chemicals and concentrations thereof to said reactor means;

(d) control means communicating with the off-gas at one or more locations within said system for qualitatively and quantitatively analyzing the same and actuating said selecting means in relationship to said analysis to provide selected reactant chemicals in predetermined quantities to said reactor means for contact with said off-gas to selectively control the types and concentrations of said matter therein;

(e) second wall means defining expansion chamber means communicating with said outlet means of said treatment chamber means and adapted to provide a reduced pressure region of treated off-gas received from said treatment chamber means;

(f) exhaust port means in said second wall means for exiting the treated, reduced kinetic energy off-gas from said expansion chamber means; and (g) cooling means for the off-gas in one or more selected portions of said system.

In certain preferred apparatus embodiments:

(1) at least one combination of interconnected chemical treatment chamber means and expansion chamber means is stacked on top of the first combination thereof and communicates with said exhaust port means of the first expansion chamber means to provide repetitive off-gas purification;

(2) said treatment chamber means is elongated and adapted for positioning above and in communication with the fire box of a combustion unit with its longitudinal axis oriented substantially vertically;

(3) said control means provides substantially continuous off-gas analysis and reactant chemical selection;

(4) said reactor means comprises multiple fluid streams of different reactant chemical compositions;

(5) cooling means is provided for maintaining said expansion chamber means at a reduced temperature;

(6) said expansion chamber means is positioned substantially vertically above said treatment chamber means;

(7) common cooling means is provided for said reactor means and second chamber means;

(8) said common cooling means comprises heat exchanger means within said expansion chamber means or proximate thereto;

(9) the outlet means of said treatment chamber means provides expansion orifice means communicating with said expansion chamber means; and

(10) gas processing means is provided communicating with said exhaust port means for receiving the treated off-gas from said expansion chamber means and is adapted to convert said treated off-gas to non-pollutant products or uses.

The invention will be further understood from the following description and drawings wherein:

FIG. 2 is a cross-sectional view taken along line 2—2 of FIG. 1 in the direction of the arrows;

FIG. 3 is a cross-sectional view taken along line 3—3 of FIG. 1 in the direction of the arrows;

FIG. 5 is a transverse, cross-sectional view of the chemical treatment section of the combustion system of FIG. 4 showing a variation of the chemical reactor means; and FIG. 6 is a variation of the power generating area of the system;

BRIEF DESCRIPTION OF THE INVENTION

Figure 1:
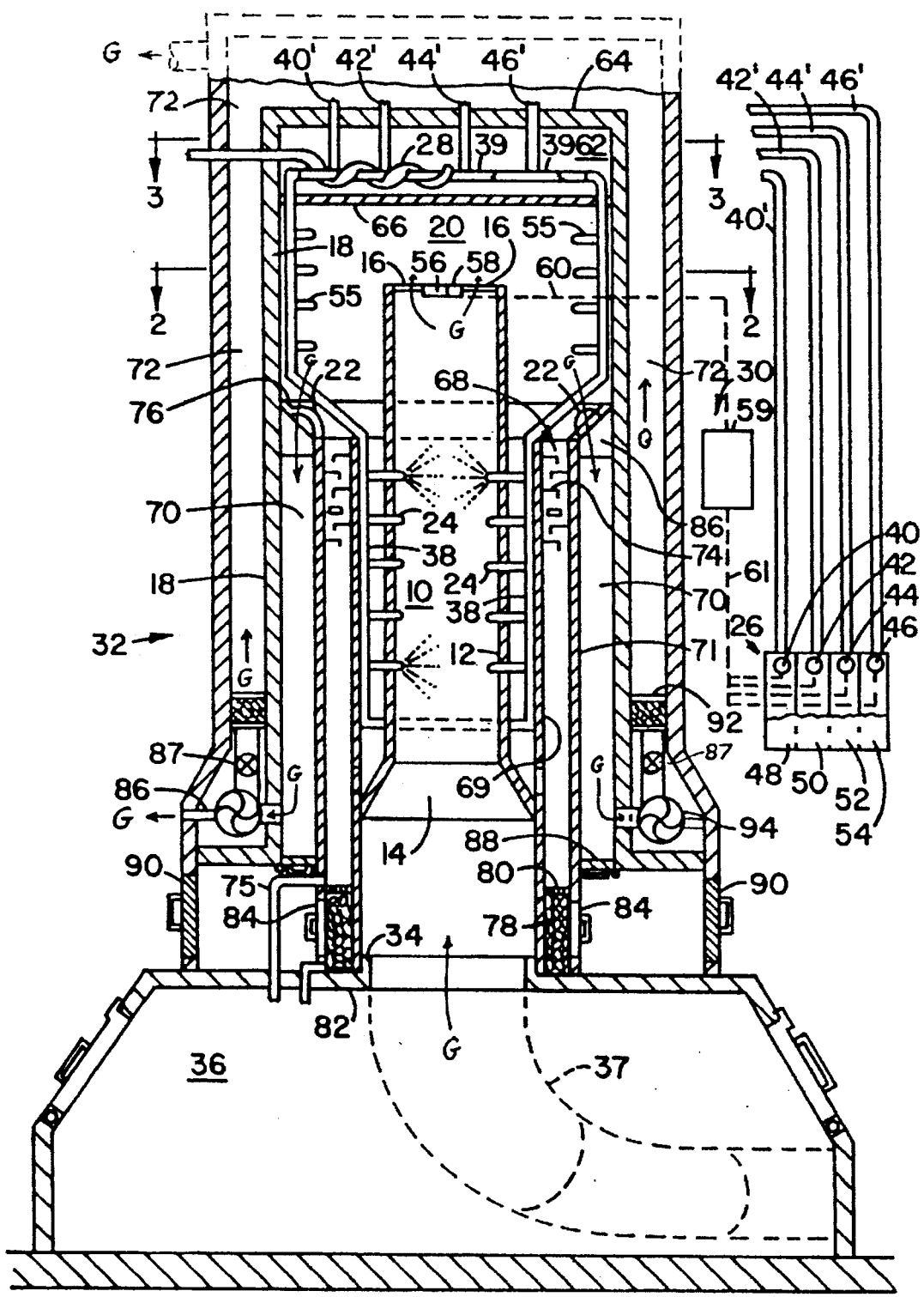
FIG. 1 is a longitudinal sectional view of a combustion system embodying the present invention.

A brief description of the present invention, with reference to the drawings and claims hereof comprises:

(a) chemical treatment chamber means 10 defined by
 (i) first wall means 12,
 (ii) off-gas inlet means 14 in said first wall means, and
 (iii) outlet means 16 in said first wall means providing an exit for chemically treated off-gas from said treatment chamber means;

(b) second wall means 18 defining off-gas expansion chamber means 20 communicating with said outlet means 16 of said treatment chamber means and adapted to provide a reduced pressure off-gas region;

(c) exhaust port means 22 in said second wall means for exiting reducing kinetic energy off-gas;

(d) reactor means 24 communicating with said treatment chamber means and adapted to provide reactant chemicals in contact with the off-gas in said treatment chamber means;

(e) reactant chemical selecting means 26 associated with said reactor means and adapted for presenting different chemicals and concentrations thereof to said off-gas in said treatment chamber means;

(f) cooling means 28 for the off-gas in one or more selected portions of said exhaust system; and (g) control means 30 communicating with the off-gas at one or more locations within said exhaust system for qualitatively and quantitatively analyzing the same and actuating said selecting means in relationship to said analysis to provide selected reactant chemicals in predetermined quantities to said reactor means for contact with said off-gas to selectively control the types and concentrations of said matter therein.

It is seen from the above description and gas flow path arrows "G" in FIG. 1, that outlet means 16 from the chemical treatment or initial scrubbing section of the flue system presents a gas flow exit across which a pressure drop occurs, either as the result of the exit being restricted, or of cooling of the second chamber, or both, and effects gas expansion and/or a cooling, and reduction in kinetic energy of the off-gas. This diminishment of molecular and particulate matter, e.g., ash particle motion or activity enhances the separability of contaminant or pollutant materials from the off-gas and controls back pressure on the overall combustion system which, if excessive, would reduce its capacity and efficiency.

DETAILED DESCRIPTION

Referring further to the drawings, a useful embodiment of the exhaust or flue system is shown as a concentrically multicylindered, columnar stack generally designated 32 fitted over the outlet neck 34 of a combustion unit chamber or firebox 36, the stack preferably being oriented in practise essentially vertically. Such a stack is readily assemblable, without significant alteration of existing auxiliary or supporting structure, onto many fireboxes presently in use in incinerator or power installations, in that it is substantially self contained and handleable as a single unit. In this regard, the stack 32 can be dimensioned in cross-section and length to accommodate existing equipment in virtually any installation. It is noted that the present exhaust system does not have to be affixed directly to a firebox outlet, but is insertable into the existing flue works of an incineration system at any desired location. In this regard, 36 as shown may be a clean-out or utility chamber and the off-gasses may be received through a flue 37 connected to a combustion chamber at a location removed or remote from chamber 36.

The reactor means 24 is shown as a series of fluid jets of any convenient number mounted in wall 12 in any desired locations and connected by suitable piping or conduit 38 to chemical selecting means 26 which is provided with suitable valving such as solenoid flow-control valves 40, 42, 44 and 46 communicating respectively with the chemical feed reservoirs 48, 50, 52 and 54 which are typically pressurized in some manner to effect the proper flow of the chemical reactants. Any number of solenoid or equivalent valving can be employed in conjunction with any number of chemical reservoirs. Also, more complex flow-control valving may be employed to premix the various chemicals, if such is desired, according to what reactions are required to control off-gas pollutants or contaminants.

In the embodiment shown, the jet feed conduit 38 is positioned on opposite sides of wall 12 in chamber 10 and is continuous at the bottom by half encircling wall 12. Several such feed conduits may be positioned around the reaction chamber. Conduit 38 extends upwardly and is connected into a mixing ring 39 to which the four chemical feed conduits 40, 42, 44 and 46 are fluid connected. It is noted that in a preferred embodiment of the invention, the various chemicals received from the aforesaid reservoirs are cooled in chamber 62 and intimately mixed within ring 39 prior to descending to the reactor jets. As a supplement to the jets in chamber 10, additional jets 55 may be provided on conduit 38 within the expansion chamber to further facilitate any necessary reactions. These additional jets, may however, be connected to another piping system, preferably cooled, to deliver scrubbing water rather than chemical reactants.

The control means generally designated 30 comprises one or more gas-analyzer probes or samplers such as 56 strategically placed within the exhaust system, preferably at the inlet to the reaction chamber 10, within the second chamber 20, and in the final exhaust conduit 72 which leads to industrial gas processing installations and/or to recycle to the combustion system, as desired. The control means further comprises off-gas analysis means 58 which is electronically associated with computer means 59 through electrical conduit 60, computer means 59 being provided with programmable capability for interpreting the off-gas analysis data with respect to the chemical feeds necessary for converting the primal off-gas contaminants to the types and levels desired. The output signals of the control means 30 are transmitted, e.g., through electrical conduit 61 to the flow-control solenoid valves of the chemical selecting means 26 to adjust the type and amount of reactant chemical feed to the ejectors or other reactor means.

The reactant chemical compositions which may be employed in practising the present invention are practically unlimited in variety, and a large number are well known and utilized for the control of elemental and the various compounds of mercury, lead, cadmium, sulfur, nitrogen, halogen, carbon, phosphorus and the like, as well as larger organic molecules such as dioxin, aldehydes, ketones, noxious sulfur containing organic molecules such as mercaptans, and the like. Examples of such chemical reactants are given in U.S. Pat. No. 3,728,433; 3,728,441; 3,728,440; and in T909,017, the disclosures of all of which are incorporated herein by reference.

The various useful reactant chemicals typically employed in off-gas scrubbing operations include water per se, aqueous slurries of $CaCO_3$, $CaO$, $NH_3$, and other such basic materials including NaOH and KOH, metal chelators such as ethylene-diametetraacetic acid, ferrous iron compounds, cyanuric acid, yellow phosphorus aqueous emulsion, alkylamines, sulfamic acid, $KMnO_4$, $HNO_3$, and aqueous hypochlorite. The particular chemical employed, i.e., selected in accordance with the present invention in response to the analysis data from control means 30, will be determined by the off-gas composition at the analysis sampling sites in the exhaust system and the desired or targeted off-gas composition.

It is noted that the emission of certain of the off-gas constituents such as carbon dioxide and nitrogen are not considered to be noxious air contaminants, and while the present process and apparatus are directed to an essentially closed-loop system for essentially eliminating non-breathable contaminants such as nitrous oxide, sulfur dioxide, carbon monoxide, phosphorous oxides, or the like, the release of resonable amounts, i.e., non-usable portions of normal air constituents, particularly from the various industrial gas processing facilities is within the ambit of the present invention. In this regard, gas processing or recovery methods are well known for the separation and recovery of $CO_2$ for use in many industrial applications such as the manufacture of dry ice. Such methods include the $K_2CO_3$ and ethanolamine processes, with, e.g., $KMnO_4$ purification.

The isolated carbon monoxide from the contained system is readily reactable with water in the presence of catalyst to give hydrogen and carbon dioxide. This reaction produces high purity hydrogen (synthesis gas) with a higher hydrogen-to-carbon monoxide ratio than the feed. Also, methanol can be manufactured by the reaction between carbon monoxide and hydrogen at 230°–400° C. and, e.g., pressures of about 300–600 atomspheres. The manufacture of acetic acid by methanol carbonylation is well known for the manufacture of acetic acide. The catalytic carbonylation reaction shown below, i.e., the hydroformylation, or oxo reaction, produces aldehydes and alcohols from carbon monoxide, hydrogen, and olefins:

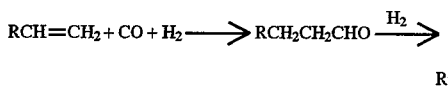

$$RCH=CH_2 + CO + H_2 \longrightarrow RCH_2CH_2CHO \xrightarrow{H_2} RCH_2CH_2CH_2OH.$$

Figure 10:
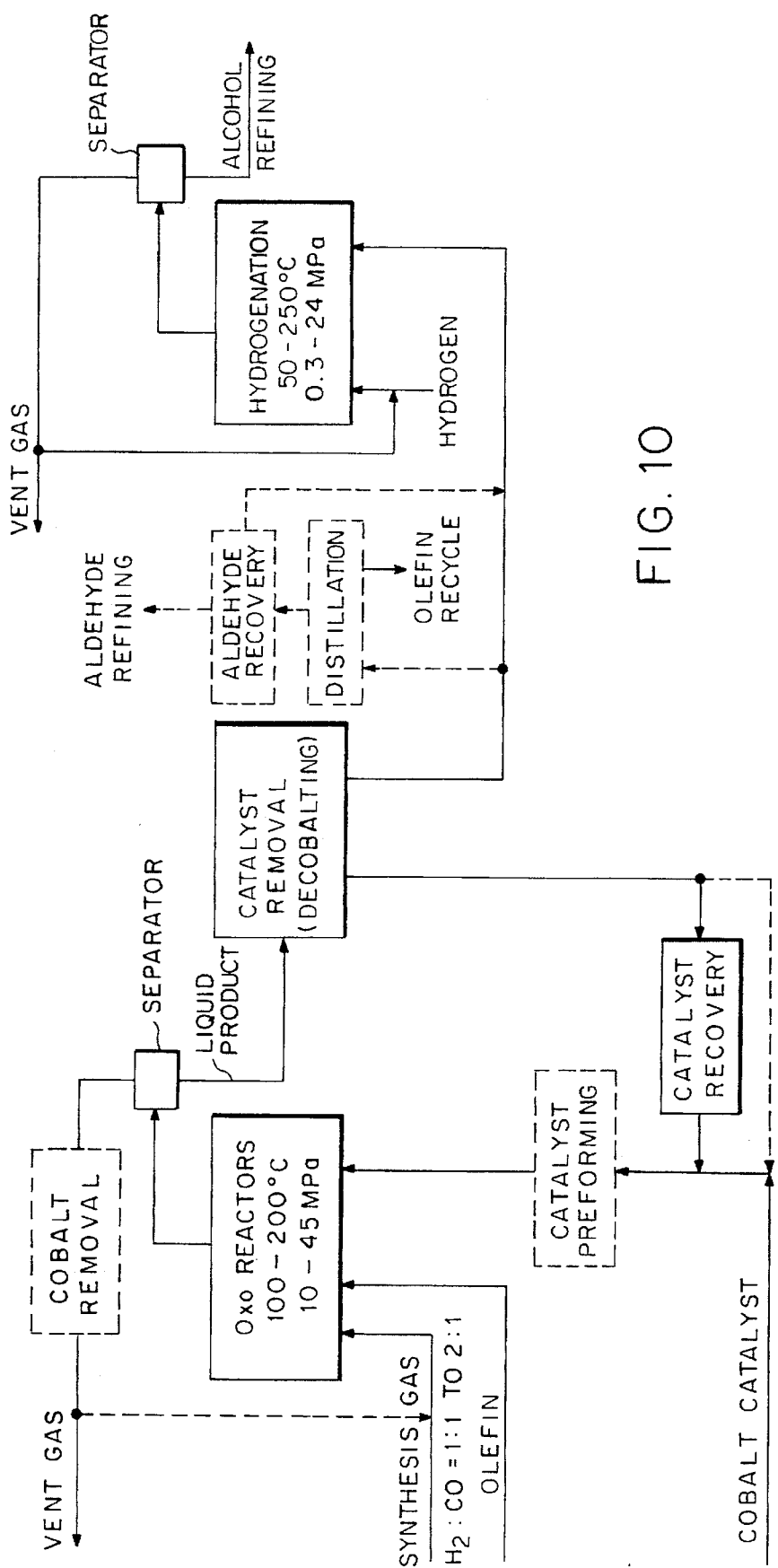
FIG. 10 is a flow chart of a typical oxo process finding utility in the present invention.

A typical oxo process flow chart is shown in FIG. 10 hereof.

Also, acrylic acid and esters are manufactured by the Reppe reaction from acetylene, methanol, and carbon monoxide: $HC{\equiv}CH + CH_3OH + CO \rightarrow CH_2{=}CHCOOCH_3$; carbon monoxide is catalytically hydrogenated to a mixture of straight-chain aliphatic, olefinic, and oxygenated hydrocarbon molecules in the Fischer-Tropsch reaction: $n\ CO + 2\ n\ H_2 \rightarrow (CH_2)_n + n\ H_2O$; and carbon monoxide is hydrogenated to methane for use as a natural gas substitute.

The type of off-gas analysis device useful in the present invention may, of course, be widely varied, and dependent to some degree on the principal types of combustible material to be fed to the firebox or combustion chamber. Typical useful gas sampling and analysis systems, both quantitative and qualitative, are disclosed in: the sales brochures of Enmet Corporation, Ann Arbor, Michigan, and in the sales brochures of Gastech Corporation, Newark, California; and in the Product Line Catalog of THERMO ENVIRONMENTAL INSTRUMENTS INC., Franklin, Massachusetts, pages 1–45, especially pages 27–31 wherein is shown and described a Flue Gas Analyzer System particularly adapted for use in the present invention. Various computerized systems for recording and interpreting the analytical data, and for actuating the valving means for pumping the required chemical solutions or slurries to the injector nozzles are known to the art of computers and related servosystems.

Figure 8:
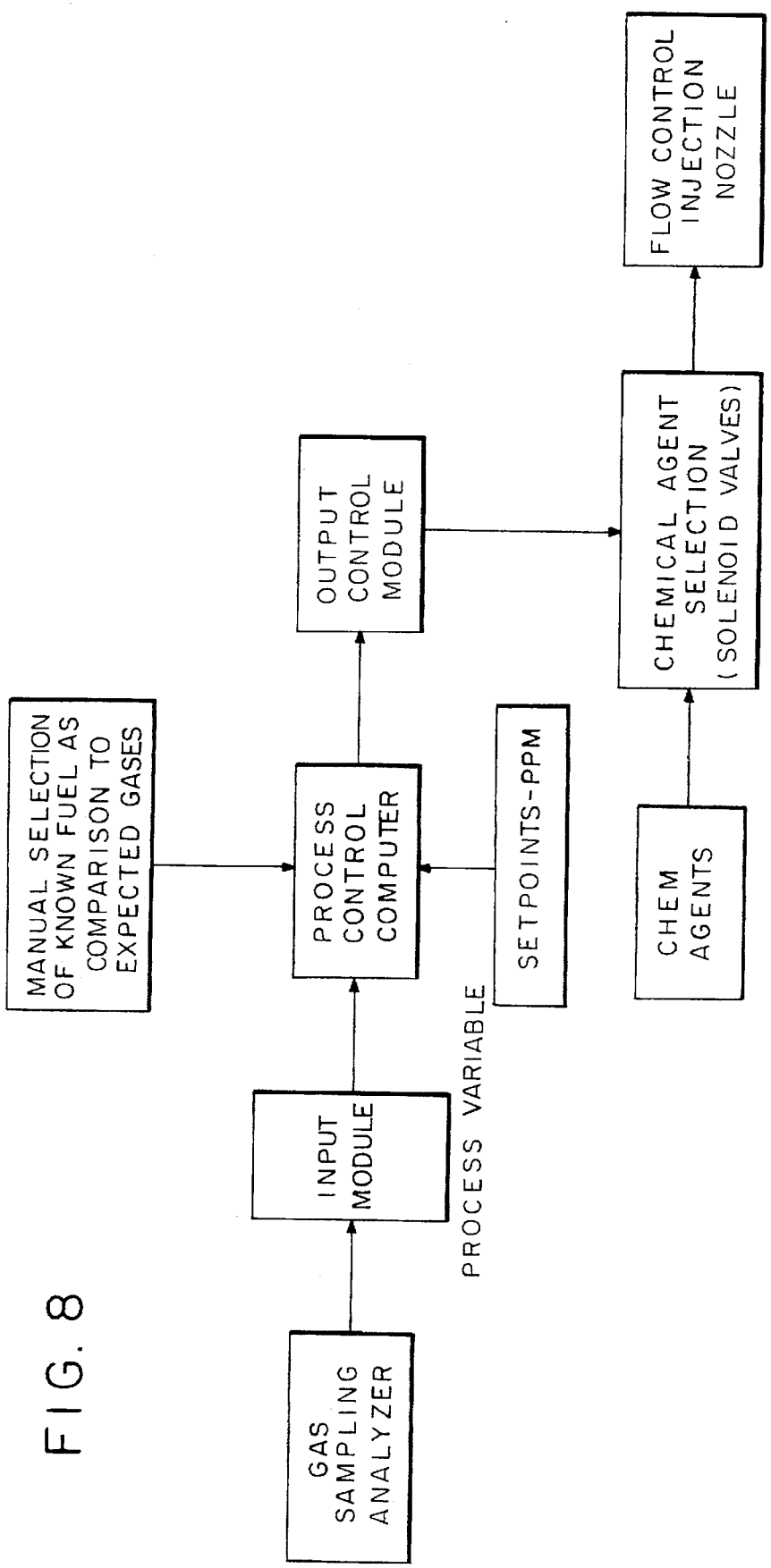
FIG. 8 is a control block diagram of the gas sampling portion of the present system.
Figure 9:
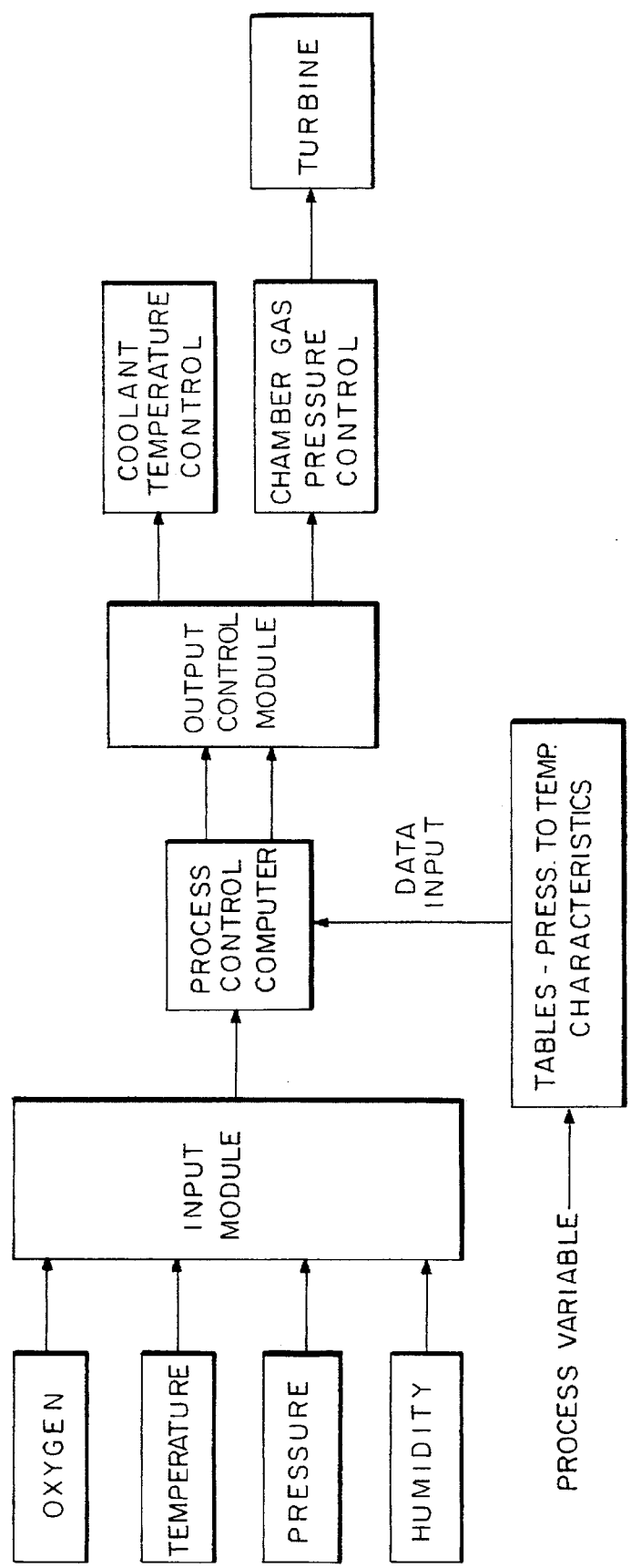
FIG. 9 is a control block diagram of the heat exchanger/gas pressure portion of the present systems.

FIG. 8, 9 and 10 are illustrative of the various operating means or modules for the computerized control system.

The cooling means is shown as the conduit 28 illustrated in FIG. 1 which is connected to a fluid coolant source such as the cooling coils of a refrigeration unit, or a circulating cooling water or salt brine source. The coolant fluid is preferably maintained below about 40° F. Conduit 28 is coiled around mixing ring 39 which is preferably mounted in a coolant chamber 62 formed by the upper side wall portion of wall 18, top 64 thereof, and floor 66. Any number of such rings 39 and cooling coils may be employed. Also, ring 39 may be in the form of a grid such that each chemical feed will travel a tortuous path for more intimate reactant mixing and enhanced cooling thereof. Alternatively or supplemental to conduit 28, this chamber 62 may be hermetically sealed and provided, in a continuing manner, with liquid coolant, such as the expanding or expanded refrigerant gas of a refrigeration unit, chilled water, or the like, through suitable fluid conduit means.

The capacity of the cooling means 28 and any supplemental cooling system, in concert with the degree of expansion of the off-gas across exit 16, if such restricted exit is employed, may be such, e.g., that the ratio of the average gas pressures in chamber 20 to the average gas pressure in chamber 10, e.g., is between about 0.95 to about 0.75, and most preferably from about 0.9 to about 0.8, although any pressure drop in chamber 20 will effect some salutary diminution in the escape propensity of particulate or other contaminant material such as to enhance its capture by, e.g., aqueous or chemical scrubbing. Where successive stacking of chemical treatment and expansion chamber combinations are employed in accordance with the present invention, in concert with extensive cooling using salt brine solution or the like, the pressures of the exhaust gas emitted to the aforesaid gas processing installations will be quite low, e.g., near atmospheric. In this regard, the pressure in chamber 20 is a function of chamber coolant temperature, the mass and kinetic energy of incoming gasses, steam condensation rate, exhaust or flue system temperature, and the like parameters.

In certain preferred embodiments, such parameters are monitored by suitable measuring devices, i.e., thermostats, humidistats, or the like, and regulated to maintain adequate pressure in chamber 20 to operate power generating equipment such as gas turbine powered electrical generators 94, the electricity which is generated thereby being available for operating the cooling system for the off-gas. Such parameter monitoring devices can be placed anywhere in the exhaust system and associated with a computer network such that, e.g., the temperature of the reactant materials and or the coolant in chamber 62, or even the rate at which combustibles are fed to the firebox, can be automatically regulated to maintain adequate pressure of the turbine gas feed. Where the cooling means utilizes the cooling fluid of a refrigeration unit, the reactant chemical feed conduits may be positioned adjacent thereto for convenient cooling of the chemical feeds. Such chemical cooling, preferably below about 40° F., reduces the kinetic energy of the off-gas in chamber 10 and assists in stabilizing desired reaction products formed therein.

In order to maximize the removal of pollutant fly ash and other particulate matter, structure is provided to cause the chemically treated, scrubbed and expanded off-gas and resultant slurry and liquid condensations to follow a baffled path for further particle size reduction and filtering. This structure comprises grid channel 68, downcomers 70, and exhaust conduit 72 formed by wall means 69, 71 and 18. Channel 68 preferably is provided along its entire length and circumference with stainless steel baffle projections 74 of such shape as to break fly ash particles within the aqueous slurry into smaller pieces for easy transport through disposal conduit means such as shown as 75. This channel, containing cooled slurry, will act as a thermal barrier to the initial off-gas heat in chamber 10. In order to direct the slurry into this channel, an angled splash plate 76 is provided encircling the channel perimeter. The lower end of channel 68 may be provided with a chemical treatment section 78 filled with limestone chunks, or other chemically reactive material, to convert the slurry passing through grid separators 80 to, for example, a neutral pH aqueous system. Suitable drain lines such as 82 and clean-out access doors 84 may be provided for this section.

The gaseous material from second chamber 20 may be further treated in downcomers 70. Each port means 22 may be provided with a cap or grid of any shape and structure to minimize the flow of slurry therethrough into the downcomers. Filtering means of any composition and construction, including granular material, may be provided in the downcomers which are provided with access doors such as 88. The filter means may be of elongated, self-supporting material such as stainless steel wool type, in the form of a cartridge for easy insertion up into the downcomers and for easy removal therefrom when depleted or fully contaminated. Access doors 90 provide each access to doors 88 and the downcomers. An upper portion of the downcomers may be provided with a permanent or long life matrix such as ceramic coated, stainless steel wire mesh or the like.

The exhaust conduit 72 portion of the exhaust system is preferably provided with filtering means 92 of any desired type, shape and size. Also, any number and capacity of exhaust fans such as 94 may be provided to over come undesirable back pressure. As mentioned above, items 94 also may represent power generating turbines or the like which can be used to generate electricity by flow of the off-gas and steam down through the downcomers. Various generating auxilliary structures such as valved, power generating gas exhaust line 86, and off-gas diverting valves 87 for use when the system is generating power, may of course, be provided by those skilled in the art. It is noted that exhaust lines 86 are also preferably connected into the gas feed lines to gas processing installations or to suitable conduit means for transport to recycle within the present combustion system. In FIG. 6, the pressurized off-gas and steam from chamber 20 flowing through grid channel 68 and treatment section 78 are conducted through outlets 79 to the turbine 94, as is the gas flowing down through the downcomers 70.

Figure 4:
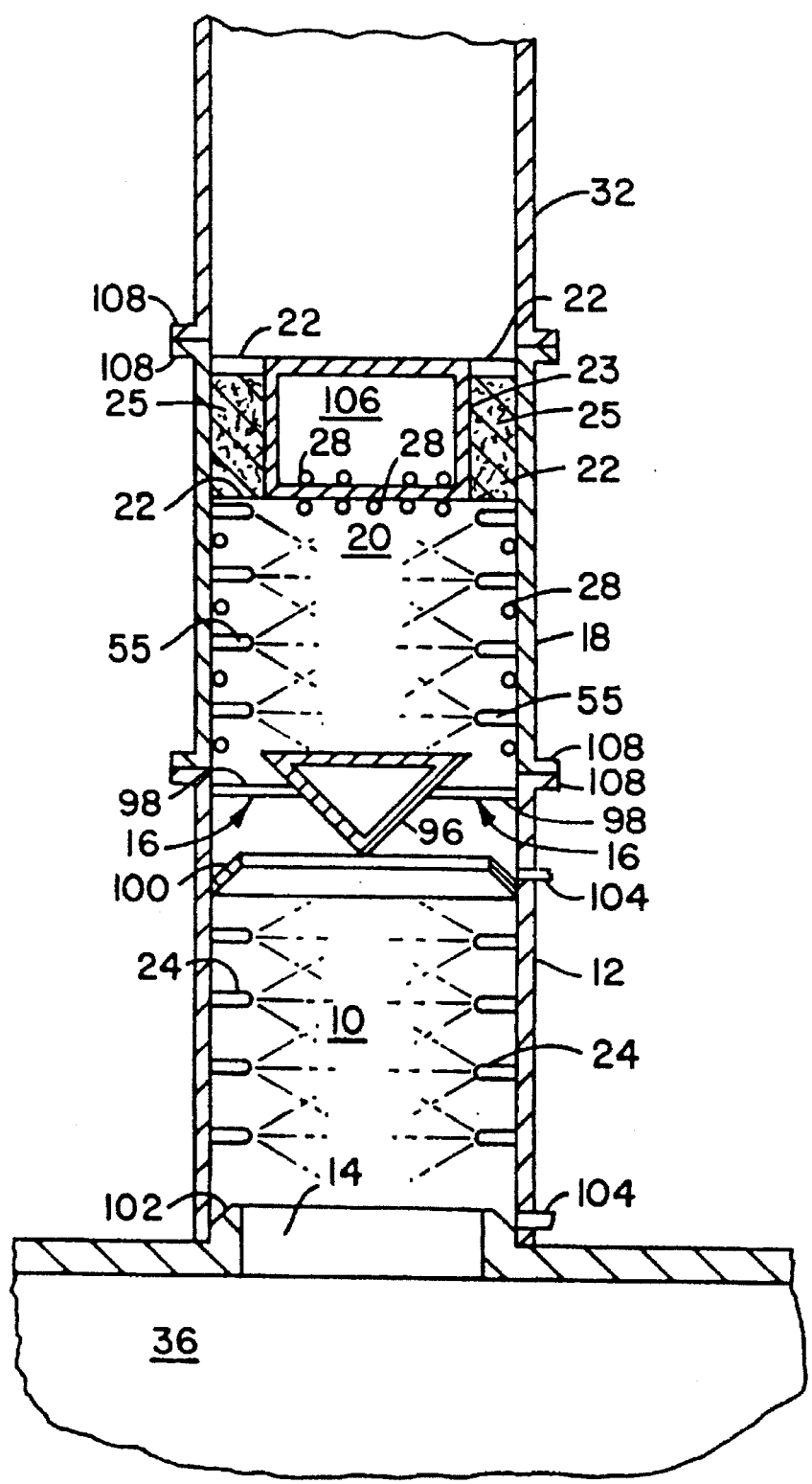
FIG. 4 is s longitudinal sectional view of a variation of the apparatus arrangement.
Figure 7:
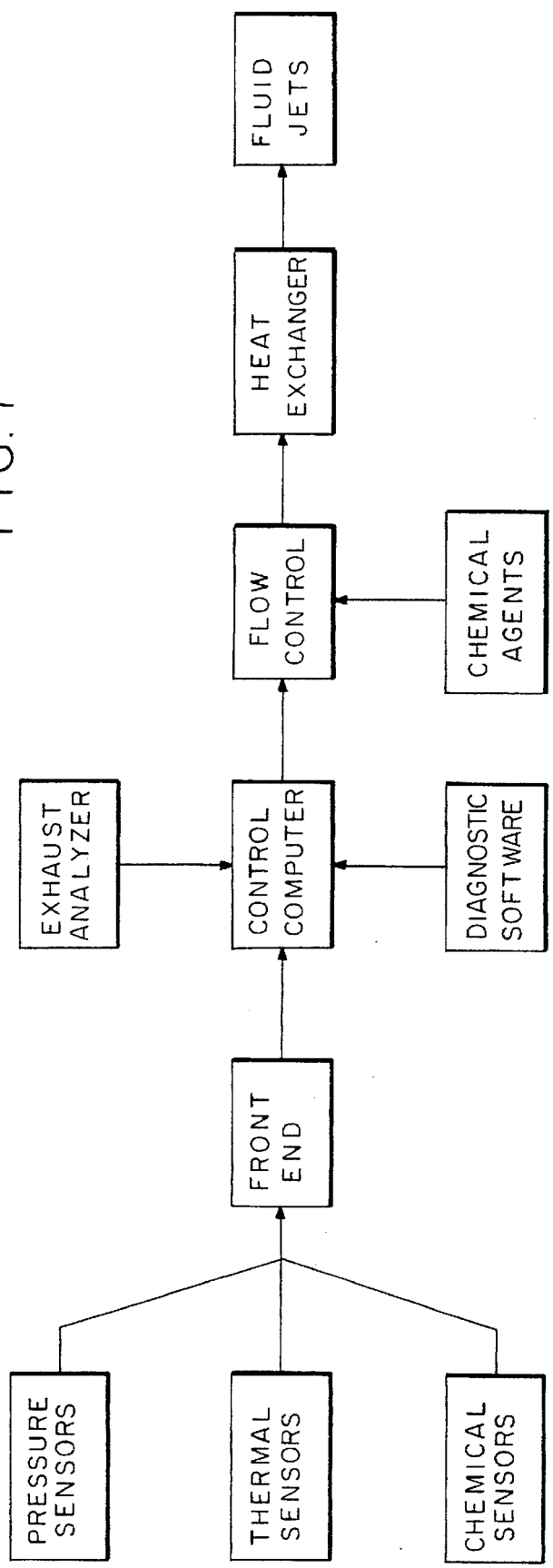
FIG. 7 is a schematic diagram of principal components of the present system.

The preferred apparatus arrangement is shown in FIGS. 1–3 wherein the configuration of the off-gas flow path is circuitous, however, the apparatus shown in FIG. 4 which is essentially vertical, can find application for certain installation in that it allows for stacking of chambers equivalent to 10 and 20 such that repetitive chemical scrubbing and kinetic energy reduction of the updrafted gas can be achieved without sacrificing significant building space such as adjoining rooms or buildings. In FIG. 4, structure equivalent to that shown in FIGS. 1–3 are numbered the same.

Referring to FIG. 4, a greatly simplified, but operable, embodiment of the invention is shown wherein the flow path of off-gas is substantially vertical and in the same general direction throughout. This embodiment utilizes the kinetic energy reduction effect as does the embodiment of FIGS. 1–3. In this embodiment the outlet 16 is defined by wall 12 and a central conical baffle 96 supported by a spider arrangement 98. This baffle assists in directing the chemically treated gases from 10 against the cooling coils 28 in chamber 20. Exhaust port means 22, of any number and size, provided through the top of cylinder 23 are preferably provided with filter means 25 such as any of those described above.

Guttering such as 100 and 102 may be provided around the inside of any of walls 12, 18 or 32 and connected to suitable drains such as 104. The cooling means 28 may be positioned as shown or in any other arrangement which is effective, and the interior 106 of cylinder 23 may be in communication with coolant as described above. Also, the feed pipes for jets 24 and 55 may pass through cylinder 23 for precooling of the chemical slurries or aqueous wash materials. The same or equivalent gas analysis probes, analyzers, computer, reactant reservoirs, chemical selecting means and the like described above are employed also with this embodiment. Baffle 96 provides a convenient site for the probes 56 and analyzer 58, however, as mentioned above, these items can be placed anywhere in the system and in any number. It is noted that the three wall sections 12, 18 and 32 are conveniently provided with bolt flanges such as 108 such that assembly and disassembly, or repetitive stacking of sections 12 and 18 combinations are facilitated.

Referring to FIG. 5, the variation in reactor means comprises one or more continuous belts 82, e.g., each of a width of about two thirds the diameter of chamber 10, mounted on rollers 112 and 114, at least one of which rollers is driven, and comprised of a fine mesh 116 of high heat resistant material such as stainless steel wire mesh or ceramic coated steel wire mesh, a reactant chemical feed plenum 118, an aqueous wash device or plenum 120, and a catch trough 122. The top and bottom of the belt pass through snug fitting slots 124 and 126 respectively in the chamber wall 12. The feed plenum 118 is shown as having six separate chambers for six different chemicals. Each chamber is provided with an outlet 128 in the form of s slot or line of closely positioned apertures running substantially the width of the belt. Suitable solenoid or the like valves are provided for each outlet such that each chemical can be dispensed onto the belt selectively in accordance with the electrical signals received from control means 30. It is preferred that the belt be provided with a substrate material such as porous ceramic chips or the like to which the aqueous or other chemical feeds could cling or be adsorbed, or that the feed materials themselves be in the form of adhesive or semi-adhesive material or emulsion of innocuous chemical composition such that the retention thereof by the belt is enhanced. The porosity of the belt and any coating thereon should be sufficiently large to allow off-gas to readily pass therethrough and contact reactant chemical thereon. The aqueous wash device 120 having water pressure inlet 130 and wash jets 132 may be provided to remove chemicals from the belt at the end of their life cycle. Many useful variations of such continuous or semi-continuous belt type reactors will become apparent to those skilled in the art and are within the purview of the present invention.

This invention has been described in detail with particular reference to preferred embodiments thereof, but it will be understood that variations and modifications will be effected within the spirit and scope of the invention.

I claim:

1. An integrated, at least substantially self-contained, at least substantially closed-loop combustion and off-gas processing system adapted for the selective control of the types and concentrations of gaseous, ionic, collodial, liquid or particulate matter, particularly noxious contaminants, contained in the off-gas of a combustion unit, and further adapted for chemical or physical processing of the contaminant-diminished off-gas through the provision of apparatus and processes contained at least substantially within and forming part of said system, said system comprising:

(a) chemical treatment chamber means defined by
 (i) first wall means,
 (ii) off-gas inlet means in said first wall means, and
 (iii) outlet means in said first wall means spaced from said inlet means and providing an exit for chemically treated off-gas from said treatment chamber means;

(b) chemical supply means communicating with said treatment chamber means and adapted to provide reactant chemicals thereto for contact with the off-gas in said treatment chamber means for producing product;

(c) reactant chemical selecting means associated with said supply means and adapted for providing selected chemicals in selected concentrations to said supply means;

(d) control means communicating with the off-gas at one or more locations within said system for qualitatively and quantitatively analyzing the same and actuating said selecting means in relationship to said analysis to provide selected reactant chemicals in selected concentrations to said supply means for contact with said off-gas to selectively control the types and concentrations of said matter therein;

(e) second wall means defining expansion chamber means communicating with said outlet means of said treatment chamber means and adapted to provide a reduced pressure region for treated off-gas received from said treatment chamber means;

(f) exhaust port means in said second wall means for exiting the treated, reduced kinetic energy off-gas from said expansion chamber means;

(g) gas processing means substantially contained within said system and isolated from the atmosphere and communicating with said exhaust port means for receiving substantial portions of the treated off-gas from said expansion chamber means, said processing means being adapted to convert said treated off-gas substantially to desirable products or uses; and (h) cooling means for the off-gas in one or more selected portions of said system.

2. The combustion system of claim 1 wherein said treatment chamber means is elongated and adapted for positioning above and in communication with the fire box of a combustion unit with its longitudinal axis oriented substantially vertically.

3. The combustion system of claim 2 wherein at least one combination of chemical treatment chamber means and expansion chamber means is stacked on top of the first combination thereof and communicates with said exhaust port means of the first expansion chamber means to provide further off-gas purification.

4. The combustion system of claim 1 wherein said control means provides substantially continuous off-gas analysis and reactant chemical selection.

5. The combustion system of claim 1 wherein said reactor means comprises multiple fluid streams of different chemical compositions.

6. The combustion system of claim 1 wherein cooling means is provided for maintaining said expansion chamber means at a reduced temperature.

7. The combustion system of claim 1 wherein said expansion chamber means is positioned substantially vertically above said treatment chamber means.

8. The combustion system of claim 1 wherein said cooling means comprises common cooling means for said reactor means and expansion chamber means.

9. The combustion system of claim 8 wherein said common cooling means comprises heat exchanger means within said expansion chamber means or proximate thereto.

10. The combustion system of claim 1 wherein the outlet means of said treatment chamber means provides expansion orifice means into said expansion chamber means.

11. The combustion system of claim 1 wherein said off-gas processing system comprises gas separation facilities for isolating carbon monoxide from said treated off-gas, and further includes oxo-process plant facilities for receiving the isolated carbon monoxide from said gas separation facilities and employing it in the oxo-process synthesis gas.

12. The combustion system of claim 1 wherein said off-gas processing system comprises gas separation facilities for isolating carbon dioxide from said treated off-gas, and further includes dry ice manufacturing facilities for receiving the isolated carbon dioxide from said gas separation facilities and employing the same in the manufacture of dry ice.

13. The process for selectively controlling the concentration of one or more chemical contaminants, either gaseous, liquid or solid, in the off-gas of a combustion system having associated, at least substantially self-contained, at least substantially closed-loop fire box means, flue system, and gas processing means, comprising carrying out the following procedures in a continuous or semi-continuous manner;

(a) analyzing the chemical composition of the off-gas at one or more locations in said flue system;

(b) directing the off-gas from the fire box means into chemical treatment chamber means dynamically maintained within selected off-gas pressure ranges;

(c) contacting the off-gas in said treatment chamber means with at least one reactant chemical previously adjusted in reactivity and specificity according to the chemical analysis of the off-gas, for converting prescribed amounts of one or more of said contaminants in said off-gas to one or more desired decontamination products;

(d) removing a selected amount of said products from the off-gas;

(e) exiting the treated off-gas from said treatment chamber means to expansion chamber means maintained within dynamically selected off-gas pressure ranges lower than those maintained in said treatment chamber means to effect a reduction in the kinetic energy of the treated off-gas and thus facilitate removal of said products therefrom; and (f) directing the products-diminished off-gas from the expansion chamber means to at least substantially contained gas processing means at least substantially isolated from the atmosphere.

14. The process of claim 13 wherein said off-gas in said expansion chamber means is scrubbed with aqueous material to separate particulate matter therefrom.

15. The process of claim 13 wherein the reduced kinetic energy off-gas is passed through filtering means for removing particulate matter therefrom prior to exiting to said gas processing means.

16. The process of claim 13 wherein the temperature and kinetic energy of the off-gas in the flue system is further reduced by contact of the off-gas with heat exchanger cooling means.

17. The process of claim 13 wherein said at least one reactant chemical comprises aqueous material containing at least one reactant chemical and is injected as a spray into said off-gas.

18. The process of claim 13 wherein a portion of the off-gas from said expansion chamber means is recycled to an up-stream section the combustion system.

19. The process of claim 13 wherein plural pairs of treatment chamber means and expansion chamber means are employed in a series arrangement.

20. The process of claim 13 wherein the off-gas from the expansion chamber means is ported to a gas separation system.

21. The process of claim 13 wherein the off-gas from the expansion chamber means is ported to an electrical power generation system.

22. The process of claim 13 wherein the off-gas from the expansion chamber means is ported to a dry ice manufacturing system.

23. The process of claim 13 wherein the off-gas from the expansion chamber means is ported to a hydroformylation reaction system.

* * * * *